United States Patent Office 3,491,035
Patented Jan. 20, 1970

3,491,035
TRANS POLYISOPRENE CONTAINING A MINOR AMOUNT OF TEREPHTHALIC ACID OR DERIVATIVE THEREOF
Richard H. Beaumont, Sutton Coldfield, England, assignor to The Dunlop Company Limited, London, England, a British company
No Drawing. Filed Dec. 19, 1966, Ser. No. 602,466
Claims priority, application Great Britain, Jan. 4, 1966, 392/66
Int. Cl. C08f 29/08
U.S. Cl. 260—5                                        19 Claims

ABSTRACT OF THE DISCLOSURE

A polymeric composition comprising trans-1,4-polyisoprene and up to 10 percent by weight of a member of the class consisting of terephthalic acid and esters thereof and terephthalic anhydride, and a method of decreasing the setting time of said composition comprising allowing same to set at a temperature at least 10° C. lower than the melting point of the class member.

---

This invention relates to improvements in polymeric compositions, particularly to polymeric compositions comprising trans-1,4-polyisoprene.

According to the present invention, a polymeric composition comprises a mixture of trans-1,4-polyisoprene and up to 10 percent by weight, based on the total polymer weight, of terephthalic acid or an ester or an anhydride of terephthalic acid.

According to the present invention also, a method of shaping the polymeric composition defined in the immediately-preceding paragraph comprises heating the composition until it is sufficiently softened to be formed into the desired shape, forming the composition into the desired shape, and allowing or causing the composition to set at a temperature at least 10° C. lower than the melting point of the terephthalic acid or ester or anhydride thereof.

According to the present invention also, a method of decreasing the setting or hardening time of a polymeric composition consisting at least in part of a trans-1,4-polyisoprene comprises incorporating in the composition up to 10 percent by weight, based on the total polymer weight, of terephthalic acid or an ester or an anhydride of terephthalic acid, said acid, ester or anhydride having a melting point at least 10° C. higher than the temperature at which the polymeric composition is allowed to crystallise on setting.

The trans-1,4-polyisoprene used in this invention may be a synthetic polymer or a natural polymer such as balata or gutta-percha, and it may be blended with one or more other polymers such as rubbers and resins which may be natural or synthetic, such as another stereoisomer of polyisoprene, a polybutadiene, neoprene or a copolymer of butadiene with styrene which may have a high or a low styrene content, if desired. In fact, in some cases, the present invention is more advantageous when using a composition comprising a blend of trans-1,4-polyisoprene with another polymer than when using trans-1,4-polyisoprene as the sole polymer constituent of the composition, especially as regards a decrease in the setting or hardening time of the composition.

As stated above, a polymeric composition according to this invention comprises terephthalic acid or an ester or an anhydride of terephthalic acid, in an amount of up to 10 percent by weight of the trans-1,4-polyisoprene or of the blend of trans-1,4-polyisoprene with one or more other polymers in the composition. Examples of suitable esters of terephthalic acid are the mono- and di-alkyl terephthalates, especially mono- and di-methyl and ethyl terephthalates, particularly dimethyl terephthalate, and the mono- and di-aryl terephthalates such as diphenyl terephthalate. When terephthalic acid is employed, it is preferred to use a terephthalic acid which has been dissolved in aqueous sodium hydroxide and reprecipitated by the addition of hydrochloric acid, since it is found that such a reprecipitated acid is more efficient in increasing the rate of crystallinity of the trans-1,4-polyisoprene. The amount of terephthalic acid or an ester or an anhydride thereof used should be up to 10 percent, and is preferably from 2 to 5 percent, especially from 2 to 3 percent by weight of the trans-1,4-polyisoprene or of the blend of trans-1,4-polyisoprene with one or more other polymers in the composition.

The terephthalic acid or an ester or an anhydride thereof is preferably mixed with molten or softened trans-1,4-polyisoprene by any of the known methods, for example it may be added in an internal mixer, e.g. a Banbury mixer, during mastication of the trans-1,4-polyisoprene, or on a mill. Alternatively, a mixture of terephthalic acid or an ester or an anhydride thereof with trans-1,4-polyisoprene can be produced by the concurrent crystallization of these substances from a solution in a suitable solvent. For example, dimethyl terephthalate and trans-1,4-polyisoprene can be dissolved in hot petrol and, on cooling the solution, a mixture of the two substances separates. If desired, more than one kind of trans-1,4-polyisoprene, e.g. a mixture of a natural and a synthetic polymer, may be included in the same polymeric composition, and similarly, the same polymeric composition may comprise any combination of terephthalic acid and/or an ester and/or an anhydride thereof. Other compounding and/or vulcanizing ingredients, e.g. antioxidants, antiozonants, fillers such as titanium dioxide, and accelerators, can be incorporated in the polymeric composition as desired. When compounding and/or vulcanizing ingredients are incorporated in the polymeric composition it is preferred to use the terephthalic acid or ester or anhydride thereof in quantities corresponding to 2 to 5 percent by weight of the total polymer.

The synthetic trans-1,4-polyisoprene that may be used in the polymeric composition of this invention may be prepared by any of the known methods, e.g. by polymerizing isoprene in the presence of a stereoregulating catalyst system such as a Ziegler-type catalyst system comprising a compound, especially a halide, of a metal of Groups IV-A to VII-A or VIII, especially Groups IV-A and V-A, of the Mendeléeff Periodic Table, and a reducing agent such as a metal or compound, especially a hydride or organo-metallic compound of a metal, of Group I, II or III of the Mendeléeff Periodic Table. A suitable catalyst system would comprise vanadium trichloride and an aluminium trialkyl, e.g. aluminium triethyl.

One of the chief advantages of the use of terephthalic acid or an ester or an anhydride thereof in the polymeric compositions of this invention is that the setting time or hardening time of the composition is decreased and this is associated with an increase in the rate of crystallisation of the trans-1,4-polyisoprene in the composition without substantially diminishing the degree of crystallinity. However, to be effective in this the terephthalic acid or ester or anhydride thereof should have a melting point at least 10° C. higher than the temperature at which the polymeric composition is allowed to crystallise on setting. Preferably, the said melting point should be at least 15° C. higher than the temperature at which the polymeric composition is allowed to crystallise on setting. A short setting or hardening time together with a high degree of crystallinity of the trans-1,4-polyisoprene is especially desirable in moulding operations, for example, when a polymeric golf ball cover composition comprising trans-1,4-polyisoprene is moulded on to a golf ball core, since the time spent in the mould need then only be short. After the moulding operation, the polymeric composition can be vulcanized, if desired.

The invention is illustrated in the following examples:

EXAMPLE I

This example shows the effect on setting or hardening time and degree of crystallinity of mixing an alkyl ester of terephthalic acid with a polymeric composition comprising trans-1,4-polyisoprene as the sole polymer constituent.

Seven samples, each of a different batch of unblended trans - 1,4 - polyisoprene, six samples being of synthetic polymers and one being of balata, were heated at 90° C. for 30 minutes to ensure complete melting and were then allowed to set at 40° C., The time ($T_{1/2}$) in minutes taken by each sample to reach 50 percent of its final crystallinity and the final degree of crystallinity (percent X) of each sample were noted. The above experiments were then repeated for similar samples of unblended trans-1,4-polyisoprene mixed with an amount of dimethyl terephthalate (DMTP) measured as a percentage of the weight of the weight of the trans-1,4-polyisoprene in each sample.

The apparatus in which the above experiments were performed comprised an inverted test-tube connected via a ground-glass joint to one end of a U-shaped 1 mm. diameter capillary tube. The experiments were performed by placing 1 gram of the sample to be tested in the inverted test-tube, connecting the U-tube and filling the whole apparatus with mercury, then heating the apparatus in a water-bath at 90° C. for 30 minutes, rapidly transferring the apparatus to a second water-bath maintained at 40° C. and the noting the rate of fall of the mercury in the capillary tube as the sample cooled and solidified. The whole of the apparatus was immersed in the waterbaths except for the free end of the U-shaped tube which was open to the atmosphere. It was noticed that before the sample solidified, he mercury level dropped at a fast rate, then remained stationary for a short time and then dropped faster again before becoming finally stationary. The first fast drop of the mercury level was owing to the thermal contraction of the sample and of the mercury on cooling from 90° C. to 40° C. and the second fast drop of the mercury level was owing to the contraction of the sample on crystallization. The time taken by each sample to reach 50 percent of its final crystallinity was calculated from a graph of the level of mercury against time, and the final degree of crystallinity of each sample was calculated from the change in density of the sample which could be found from the dimensions of the capillary tubing.

The results are given in Table I:

TABLE I

| Batch | Percent DMTP | $T_{1/2}$ | Percent X |
|---|---|---|---|
| 1 | 0 | 63 | 30.1 |
|   | 2.5 | 11.5 | 34 |
|   | 5 | 18 | 31.2 |
| 2 | 0 | 46.6 | 29.6 |
|   | 3 | 10.6 | 29.3 |
| 3 | 0 | 34.5 | 30.7 |
|   | 1.5 | 33.1 | 29.6 |
|   | 3 | 8.7 | 28 |
| 4 | 0 | 22.2 | 29.3 |
|   | 3 | 11.2 | 31 |
| 5 | 0 | 85 | 34.5 |
|   | 3 | 7.5 | 35.2 |
| 6 | 0 | ca. 350 | 32 |
|   | 2 | 152 | 29 |
|   | 2.5 | 46 | 25.5 |
|   | 3 | 26 | 28 |
|   | 4 | 40 | 27 |
| 7 | 0 | 20 | 32.3 |
|   | 3 | 5 | 31.5 |

Batch No. 7 was the balata batch.

The above results show that the addition of an alkyl ester of terephthalic acid, namely dimethyl terephthalate, to unblended trans-1,4-polyisoprene gives rise to a decrease in the setting or hardening time whilst retaining a high degree of crystallinity of trans-1,4,polyisoprene.

EXAMPLE II

This example shows the effect on setting or hardening time and degree of crystallinity of mixing an alkyl ester of terephthalic acid with a polymeric composition comprising trans-1,4-polyisoprene blended with another rubber and with compounding ingredients.

Four polymeric compositions, 1 to 4, were prepared from the formulations given in Table II.

TABLE II

|  | 1 | 2 | 3 | 4 |
|---|---|---|---|---|
| Trans-1,4-polyisoprene | 83 | 83 | 68 | 68 |
| Natural rubber | 0 | 0 | 15 | 15 |
| Titanium dioxide | 13 | 13 | 13 | 13 |
| Zinc oxide | 3 | 3 | 3 | 3 |
| Sulphur | 1 | 1 | 1 | 1 |
| Accelerator | 1 | 1 | 1 | 1 |
| DMTP | 0 | 3 | 0 | 3 |

The time ($T_{1/2}$) in minutes taken by a sample of each composition to reach 50 percent of its final crystallinity, and the final degree of crystallinity (percent X) of each composition were measured as described in Example I and the results are given in Table III:

TABLE III

| Composition | $T_{1/2}$ | Percent X |
|---|---|---|
| 1 | 73 | 24.7 |
| 2 | 8.5 | 23.4 |
| 3 | 114 | 22.6 |
| 4 | 20 | 22.6 |

A sample of each composition was heated at 80° C. for 15 minutes and then allowed to cool to an ambient temperature of 20° C. Whilst each sample was cooling, its Shore C Hardness was measured on a gauge at various times and the results are given in Table IV in which:

Time at 50°=the time (min.) taken by the sample to attain a Shore C Hardness of 50°, and
Hardness at 30=the Shore C Hardness (°) of the sample after 30 minutes.

TABLE IV

| Composition | Time at 50° | Hardness at 30 |
|---|---|---|
| 1 | 9.3 | 65 |
| 2 | 7.5 | 68 |
| 3 | 18.5 | 53 |
| 4 | 11.0 | 59 |

The results in Tables III and IV show that the addition of an alkyl ester of terephthalic acid, namely dimethyl terephthalate, to a polymeric composition comprising a blend of trans-1,4-polyisoprene with another rubber, namely natural rubber, and with compounding ingredients gives rise to a decrease in the setting or hardening time whilst retaining a high degree of crystallinity of the blend.

EXAMPLE III

This example shows the effect of terephthalic acid on the setting or hardening time and degree of crystallinity of trans-1,4-polyisoprene.

The time ($T_{1/2}$) in minutes taken by samples of a synthetic trans-1,4-polyisoprene with and without various added amounts of terephthalic acid to reach 50 percent of their final crystallinity and the final degree of crystallinity (percent X) of each sample were determined as described in Example I and the results are given in Table V in which "percent acid" is the amount of terephthalic acid measured as a percentage by weight of the trans-1,4-polyisoprene.

TABLE V

| Percent Acid | $T_{1/2}$ | Percent X |
|---|---|---|
| 0 | 50 | 31.2 |
| 1 | 39 | 29.8 |
| 2 | 14 | 31.5 |
| 3 | 10 | 32.5 |
| 5 | 11 | 30.1 |

The results in Table V show that the addition of terephthalic acid decreases the setting or hardening time whilst retaining a high degree of crystallinity of trans-1,4-polyisoprene.

EXAMPLE IV

This example shows the effect of an aryl ester of terephthalic acid on the crystalline properties of a polymeric composition comprising trans-1,4-polyisoprene as the sole polymer constituent.

Various proportions of diphenyl terephthalate were mixed with a synthetic trans-1,4-polyisoprene and the time ($T_{1/2}$) in minutes taken by a sample of each mixture to reach 50 percent of its final crystallinity, and the final degree of crystallinity (percent X) of each mixture were measured as described in Example I. The results are given in Table VI in which "percent DPTP" is the weight percentage of diphenyl terephthalate admixed with the trans-1,4-polyisoprene.

TABLE VI

| Percent DPTP | $T_{1/2}$ | Percent X |
|---|---|---|
| 0 | 52.1 | 32 |
| 1 | 27.1 | 31.2 |
| 2 | 21.8 | 30.7 |
| 3 | 17.7 | 29.8 |
| 5 | 15.7 | 28.5 |

These results show that an aryl ester of terephthalic acid, namely diphenyl terephthalate, is effective in decreasing the setting or hardening time whilst retaining a high degree of crystallinity of trans-1,4-polyisoprene.

EXAMPLE V

This example shows the effect of terephthalic acids from various sources on the crystalline properties of a polymeric composition comprising trans-1,4-polyisoprene.

Samples of synthetic trans-1,4-polyisoprene were mixed with 3 weight percent of various terephthalic acids and the time ($T_{1/2}$) in minutes taken by each sample to reach 50 percent of its final crystallinity and the final degree of crystallinity (percent X) of each sample were measured as described in Example I. The results are given in Table VII in which:

A is a commercially available partially crystalline terephthalic acid
B is A which has been purified by sublimation
C is A which has been dissolved in aqueous sodium hydroxide and reprecipitated by the addition of hydrochloric acid.

TABLE VII

| Terephthalic Acid | $T_{1/2}$ | Percent X |
|---|---|---|
| None | 28.5 | 29.5 |
| A | 15 | 30.7 |
| B | 23 | 29.5 |
| C | 8 | 29 |

These results show that a terephthalic acid which has been reprecipitated from aqueous sodium hydroxide is more effective in improving the crystalline properties of trans-1,4-polyisoprene.

EXAMPLE VI

This example shows the effect of some carboxylic acids other than terephthalic acid on the crystalline properties of a polymeric composition comprising trans-1,4-polyisoprene.

Samples of a synthetic trans-1,4-polyisoprene were each mixed with 3 weight percent of one of the following carboxylic acids and the crystalline properties of the mixtures were measured as described in Example I. The results are given in Table VIII:

TABLE VIII

| Acid | $T_{1/2}$ | Percent X |
|---|---|---|
| None | 57 | 32.4 |
| Phenyl acetic acid | 80.5 | 30.7 |
| Benzoic acid | 66 | 29.2 |
| Lauric acid | 90 | 30.6 |
| Stearic acid | 63.5 | 27.4 |
| Capric acid | 72 | 31.1 |
| Succinic acid | 57 | 31.8 |
| Oxalic acid | 61 | 31.1 |
| Adipic acid | 57 | 28.5 |
| o-Phthalic acid | 75 | 32.7 |
| Sebacic acid | 53 | 31.2 |
| Tartaric acid | 52 | 27.4 |

These results show that the carboxylic acids employed in this example are comparatively ineffective in reducing the $T_{1/2}$ whilst retaining a high percent X.

EXAMPLE VII

This example shows the effect of the difference between the melting point of the terephthalic acid or the ester or anhydride thereof employed and the temperature at which the polymeric composition incorporating the terephthalic acid or the ester or anhydride thereof is allowed to crystallise on setting.

A sample of a synthetic trans-1,4-polyisoprene was mixed with 3 weight percent of diethyl terephthalate (melting point=44° C.) and the rate of crystallisation and degree of crystallinity were measured as described in Example I. The experiment was then repeated twice except that the temperature of the second water-bath described in Example I was 35° C. and 30° C., respectively instead of 40° C. The results are compared with the results of measurements on the trans-1,4-polyisoprene in the absence of diethyl terephthalate in Table IX in which "percent DETP" is the weight percentage of diethyl terephthalate in the mixture.

TABLE IX

| Bath Temperature (° C.) | Percent DETP | $T_{1/2}$ | Percent X |
|---|---|---|---|
| 40 | 0 | 36 | 31.2 |
| 40 | 3 | 71 | 29.3 |
| 35 | 0 | 18 | |
| 35 | 3 | 25 | |
| 30 | 0 | 6.5 | |
| 30 | 3 | 5.5 | |

These results show that the bath temperature, i.e. the temperature at which the polymeric compositions are allowed to crystallise, should be at least 10° C. below the melting point of the diethyl terephthalate employed.

Having now described my invention—what I claim is:

1. A polymeric composition comprising a polymer selected from the group consisting of trans-1, 4-polyisoprene and mixtures of at least about 80 percent by weight of trans-1,4-polyisoprene with up to 20 percent by weight of a diolefin rubber, and up to 10 percent by weight, based on the total polymer weight, of a compound selected from the group consisting of monomeric terephthalic acid, lower alkyl or phenyl esters thereof and monomeric terephthalic anhydride.

2. A polymeric composition according to claim 1 in which said compound is present in an amount from 2 to 4 percent by weight based on the total polymer weight.

3. A polymeric composition according to claim 2 in which said compound is present in an amount from 2 to 3 percent by weight based on the total polymer weight.

4. A polymeric composition according to claim 1 comprising trans-1,4-polyisoprene and terephthalic acid which has been dissolved in aqueous sodium hydroxide and reprecipitated by the addition of hydrochloric acid before it is incorporated in the polymeric composition.

5. A polymeric composition according to claim 1 comprising trans-1,4-polyisoprene and a dialkyl ester of terephthalic acid.

6. A polymeric composition according to claim 5 in which the dialkyl ester is the dimethyl ester.

7. A polymeric composition according to claim 1 comprising trans-1,4-polyisoprene and a diaryl ester of terephthalic acid.

8. A polymeric composition according to claim 7 in which the diaryl ester is the diphenyl ester.

9. A polymeric composition according to claim 1 in which the diolefin rubber is natural rubber.

10. A polymeric composition according to claim 1 in which the polymer consists essentially of trans-1,4-polyisoprene.

11. A polymeric composition according to claim 1 in which the trans-1,4-polyisoprene is a synthetic polymer.

12. A polymeric composition according to claim 1 in which the trans-1,4-polyisoprene is a natural polymer.

13. A polymeric composition according to claim 1 which is produced by the concurrent crystallisation of the composition ingredients from a suitable solvent.

14. A method of decreasing the setting time of a polymeric composition consisting of a major proportion of a trans-1,4-polyisoprene which comprises incorporating in the composition up to 10 percent by weight, based on the total polymer weight, of a compound selected from the group consisting of monomeric terephthalic acid, lower alkyl or phenyl esters thereof and monomeric terephthalic anhydride, and allowing the composition to set at a temperature at least 10° C. lower than the melting point of said compound.

15. A method according to claim 14 in which the composition is allowed to set at a temperature at least 15° C. lower than the melting point of said compound.

16. A method according to claim 14 in which the amount of said compound is from 2 to 5 percent by weight based on the total polymer weight.

17. A method according to claim 16 in which the amount of said compound is from 2 to 3 percent by weight based on the total polymer weight.

18. A method of shaping a polymeric composition comprising a mixture of trans-1,4-polyisoprene and up to 10 percent by weight, based on the total polymer weight of a compound selected from the group consisting of monomeric terephthalic acid, lower alkyl or phenyl esters thereof and monomeric terephthalic anhydride, which comprises heating the composition until it is sufficiently softened to be formed into the desired shape, forming the composition into the desired shape, and allowing the composition to set at a temperature at least 10° C. lower than the melting point of said compound.

19. A method of shaping according to claim 18 in which the composition is allowed to set at a temperature at least 15° C. lower than the melting point of said compound.

References Cited

UNITED STATES PATENTS

| | | | |
|---|---|---|---|
| 3,213,160 | 10/1965 | Crouch | 260—894 |
| 3,354,239 | 11/1967 | Short | 260—876 |
| 2,628,207 | 2/1953 | Smith et al. | 260—31.8 |
| 3,346,528 | 10/1967 | Slocombe et al. | 260—31.8 |
| 3,362,937 | 1/1968 | Kent | 260—5 |

FOREIGN PATENTS 874,240   8/1961   Great Britain.

OTHER REFERENCES

A. G. M. Last, Journal of Polymer Science, 39, 543 (1959), pp. 543, 544.

SAMUEL H. BLECH, Primary Examiner

M. J. TULLY, Assistant Examiner

U.S. Cl. X.R.

260—23.7, 31.2, 31.8, 41.5, 79.5, 94.7, 709, 752, 767, 186, 890, 894